(12) United States Patent
Taugher et al.

(10) Patent No.: US 7,268,795 B2
(45) Date of Patent: Sep. 11, 2007

(54) LABELING METHODS AND APPARATUS USING ELECTROMAGNETIC RADIATION

(75) Inventors: Lawrence N. Taugher, Loveland, CO (US); Makarand P. Gore, Corvallis, OR (US); Kevin L. Colburn, Greeley, CO (US); D. Mitchel Hanks, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 269 days.

(21) Appl. No.: 10/976,445

(22) Filed: Oct. 29, 2004

(65) Prior Publication Data

US 2006/0092262 A1    May 4, 2006

(51) Int. Cl.
*B41J 2/435* (2006.01)
(52) U.S. Cl. .................................... 347/224
(58) Field of Classification Search .... 369/47.5–47.51, 369/59.11, 99.08, 132–135; 347/224–225
See application file for complete search history.

(56) References Cited

U.S. PATENT DOCUMENTS

| | | | |
|---|---|---|---|
| 5,478,702 A | 12/1995 | Kawai | |
| 5,748,607 A | 5/1998 | Ohira | |
| 6,731,317 B2 | 5/2004 | Ema et al. | |
| 6,754,158 B1 | 6/2004 | Kobayashi | |
| 2002/0191517 A1 | 12/2002 | Honda | |
| 2003/0222965 A1 | 12/2003 | Field | |
| 2004/0056944 A1 | 3/2004 | Bronson | |
| 2004/0240105 A1* | 12/2004 | Narumi et al. | 360/99.08 |
| 2005/0105437 A1* | 5/2005 | Shimofuku | 369/59.11 |

FOREIGN PATENT DOCUMENTS

| | | | |
|---|---|---|---|
| JP | 09306144 A | * | 11/1997 |
| WO | WO 2004/057602 | | 7/2004 |

* cited by examiner

*Primary Examiner*—Hai Pham

(57) ABSTRACT

A method and apparatus are provided for visually marking a recording medium by inducing a phase change in a light-sensitive surface by heat absorption from laser radiation. The method includes applying the laser radiation to a desired portion of the light-sensitive surface according to a first power profile for a first period sufficient to substantially obtain a color change at the desired portion, and applying the laser radiation to the desired portion of the light-sensitive surface according to a second power profile for a second period sufficient to complete the color change at the desired portion.

58 Claims, 7 Drawing Sheets

LABELING METHODS AND APPARATUS USING ELECTROMAGNETIC RADIATION

BACKGROUND

Recently, apparatus and methods have been developed with the ability to generate an image on media using a low power laser, such as a laser of the type that is employed to read and write data on the data side of optical storage discs. Optical discs, such as recordable CDs, DVDs and the like typically have various types of data written on a data side of a disc by a laser beam while the disc is rotating. Various data writing strategies have been employed, for the purposes of creating desirably shaped marks precisely positioned and having sharp edges to enable detection during a subsequent read operation. In some cases, data writing strategies have included laser beams using modulated power, including laser pulses.

The other side of such a disc is often used for handwriting or affixing a label with descriptions and/or illustrations descriptive of the recorded data. Recently, apparatus and methods have been developed with the ability to generate a label on the non-data side of an optical disc using the same laser that was employed to read and write digital or electronic data on the data side of the disc. See U.S. Patent Application Publication No. 2003/0108708 (Anderson, et al.), using laser sensitive materials on a disc label that react chemically upon the application of light and heat, resulting in changes in color and shading on the label. In such instances, labels may be generated on discs by applying continuous laser power to a label surface. However, this approach may result in undesirable ablation of the recording medium and power inefficiencies in the apparatus.

SUMMARY OF THE INVENTION

In one embodiment of the present invention, a method is provided for visually marking a recording medium by inducing a phase change in a light-sensitive surface by heat absorption from laser radiation. The method comprises applying the laser radiation to a desired portion of the light-sensitive surface according to a first power profile for a first period sufficient to substantially obtain a color change at the desired portion, and applying the laser radiation to the desired portion of the light-sensitive surface according to a second power profile for a second period sufficient to complete the color change at the desired portion.

DETAILED DESCRIPTION

Figure 1:
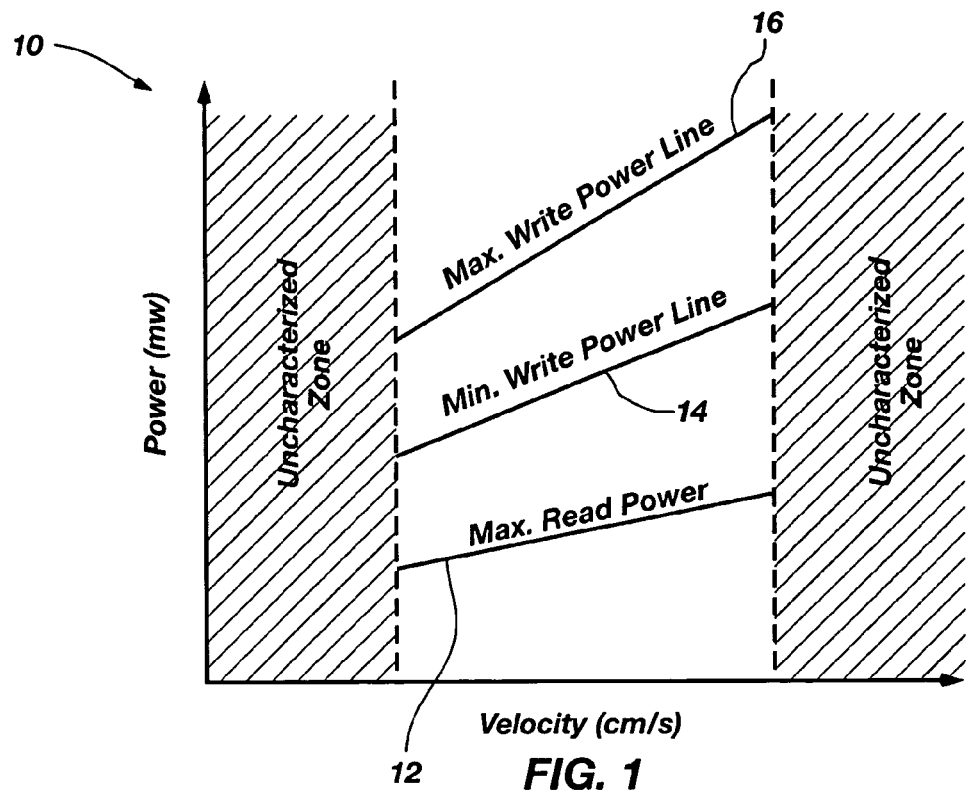
FIG. 1 is a power versus velocity graph for a recording medium on which optically visible marks are formed by an image recording device according to an embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

In one field of electronic digital data recording technology, a laser is used to write and read digital data on a data side of a rotating disc medium, such as a compact disc (CD), digital versatile disc (DVD) or other such recording media, that is used in a recording device. The present invention involves writing or marking optically visible marks on a light sensitive medium, such as a label side of the recording medium opposite the data side, to form text, graphics, images, or a combination thereof that could be used to describe or represent the data on the recording medium. This imaging technology can be widely used to apply markings to any medium with light sensitive coating. In one embodiment the technology can be used to apply markings to one side of a recording medium that enables the formation of images. This medium may include two or more chemicals that can be liquefied by the application of heat. A laser may be used to apply heat to the chemicals on the label side, such as the same laser that is used to write and read data on the data side of the electronic media. As the chemicals are activated they begin to interact, forming visible marks on the media. By varying the application of the laser energy as it scans across the light-sensitive surface, the marks create images on or in the medium in any desired manner.

The present invention is concerned with controlling the amount of laser power delivered to the recording medium by the recording device so as to maintain the energy input of the recording medium between a minimum level needed to provide the desired chemical changes and a maximum level at which disintegration or mechanical ablation of the recording medium starts to occur. The amount of energy delivered to the recording medium is controlled by the level of power applied, the length of time that power is delivered to the recording medium and the speed at which the recording device is rotating the medium. In addition, there is a specific set of changes in properties of the recording medium which occur during the process of imaging that are temperature dependent, such as glass transition, viscosity, and molecular mobility changes.

FIG. 1 is a graph 10 showing power applied to a recording medium versus rotating velocity of the recording device. A maximum read power level 12 is shown, which is significantly below a minimum write power level 14 needed to write on the recording medium (not shown). The minimum write power line 14 is the minimum laser power needed to create an optically visible mark having acceptable optical density and fade tolerance. The maximum write power line 16 shown is the maximum continuous laser power above which a significant amount of ablation in the recording medium begins to occur.

Figure 2:
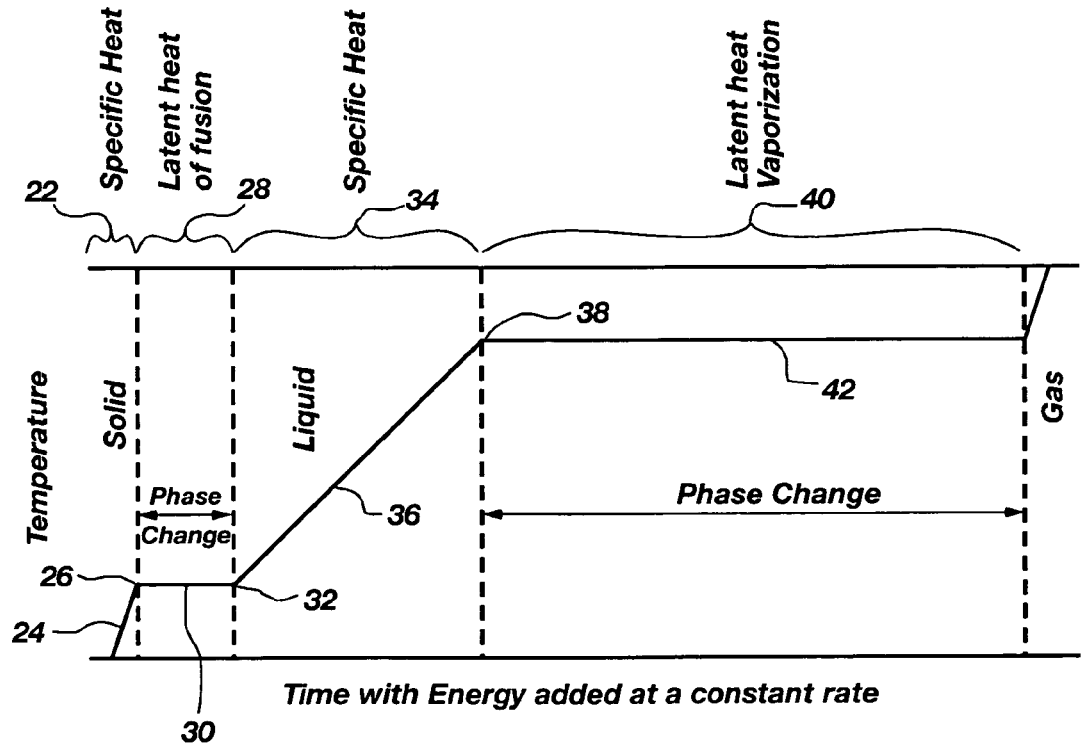
FIG. 2 is a temperature versus time graph according to the embodiment represented in FIG. 1.

Without subscribing to, or being limited by one particular theory or set of changes, FIG. 2 is a graph 20 representing one possibility of chemical and physical changes to the recording medium and showing the temperature of the recording medium versus time with energy added at a constant rate. In a first time period 22, the temperature 24 rises until the specific heat of the solid medium has been applied, at which point 26, a phase change begins to occur with the solid changing to a glass or a liquid. During the next time period 28, the temperature 30 of the recording medium remains a constant level, as all of the applied power is used to provide the latent heat of fusion, or glass transition, needed for the recording medium to fully change to a glass or a liquid.

At point 32, the latent heat of fusion has been provided. As power is continually applied during a glass or a liquid specific heat period 34, the temperature 36 of the glass or a liquid recording medium again begins to rise. Finally, at an ablation point 38, a phase change from solid, glass or a liquid to vapor begins to occur. During the next period 40, the temperature 42 is held steady as the latent heat of vaporization is provided to the recording medium.

During period 40, undesirable ablation occurs, as the recording medium is vaporized. Accordingly, it is desirable to maintain the power applied to the recording medium for labeling purposes at a level, or in a profile or sequence, such the temperature of the recording medium does not substantially reach the ablation point 38. However, it is also important during the writing period to keep the temperature of the recording medium at a sufficiently high level to continue the label writing process. This result can be achieved by combining power levels with timing periods and rotating speed of the recording medium in the recording device, as will be described in more detail below.

Figure 3:
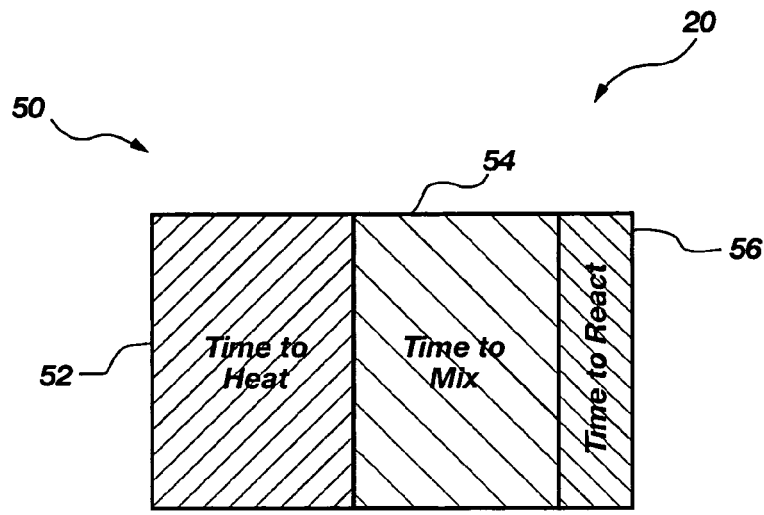
FIG. 3 is an optically visible mark timing graph according to the embodiment represented in FIG. 1.

FIG. 3 shows an imaged mark timing graph 50, depicting without quantification the time required to make an acceptable mark, according to the present invention. Time period 52 represents a time during which the recording medium (not shown) must be heated to a level at which liquefaction begins. A second longer time period 54 represents a time during which the marking materials become liquefied enough to mix together. Finally, a shorter time period 56 represents a time during which the mixed marking materials react sufficiently to form a desired optically visible mark. The purpose of the process shown in graph 50 is to form a mark having a certain predetermined contrast with the unmarked background of the label. Looking next at FIG. 4, a combined graph 60 is shown in which the graph 50 of FIG. 3 has been superimposed over the time versus temperature graph 20 of FIG. 2. The time to heat 52 coincides with a combination of the periods 22 and 28 in graph 20. This is the time during which the solid recording medium is heated to the point of that the liquefaction phase change has been completed. The time to mix 54 and the time to react 56 both occur during the specific heat period 34 of the glass or a liquid, prior to the time that the undesirable ablation point 38 is reached. The rotating speed of the recording device (not shown) is at a rate (referred to as 1x) such that the time graph 50 ends with the temperature of the recording medium at point 62 before the ablation point 38 is reached.

Accordingly, with the recording device rotating at speed 1x, if the application of power to the recording medium ceases at point 62, no ablation will occur in the write process shown in graph 62. FIG. 5 shows a combined graph 70, with the recording device (not shown) rotating at twice the speed (referred to as 2x) as the rotating speed of the recording device relative to the graph 60 shown in FIG. 4. Again, graph 70 is a combination of the time graph 50 shown in FIG. 2 and the time versus temperature graph shown in FIG. 3. As before, the time to heat 52 coincides with the combination of periods 22 and 28 in FIG. 2. However, since the recording device is rotating at twice the speed of that shown in FIG. 4, the time to mix 54 and the time to react 56 combine to extend to a point 72 that is past ablation point 38 and into the vaporization time period 40. Accordingly, with the recording device rotating at speed 2x, significant ablation of the recording medium will occur before the time to react has been completed.

Figure 4:
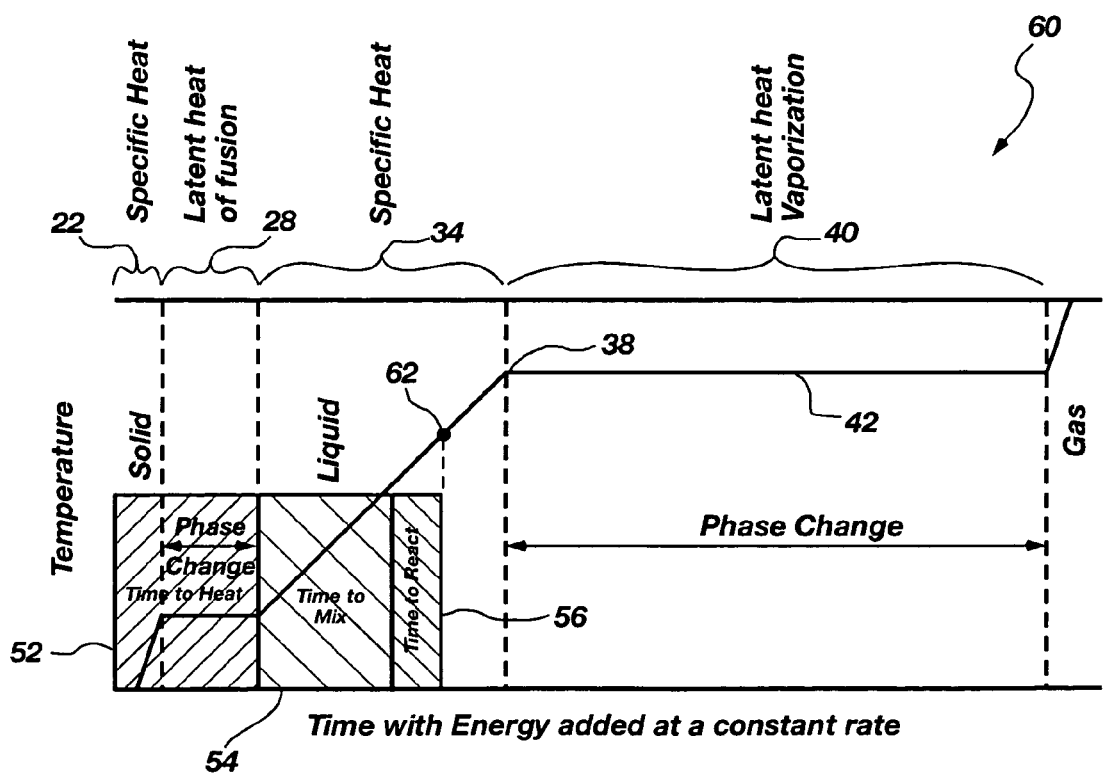
FIG. 4 is a combined temperature versus time graph and optically visible mark timing graph for a first velocity according to the embodiment represented in FIG. 1.
Figure 5:
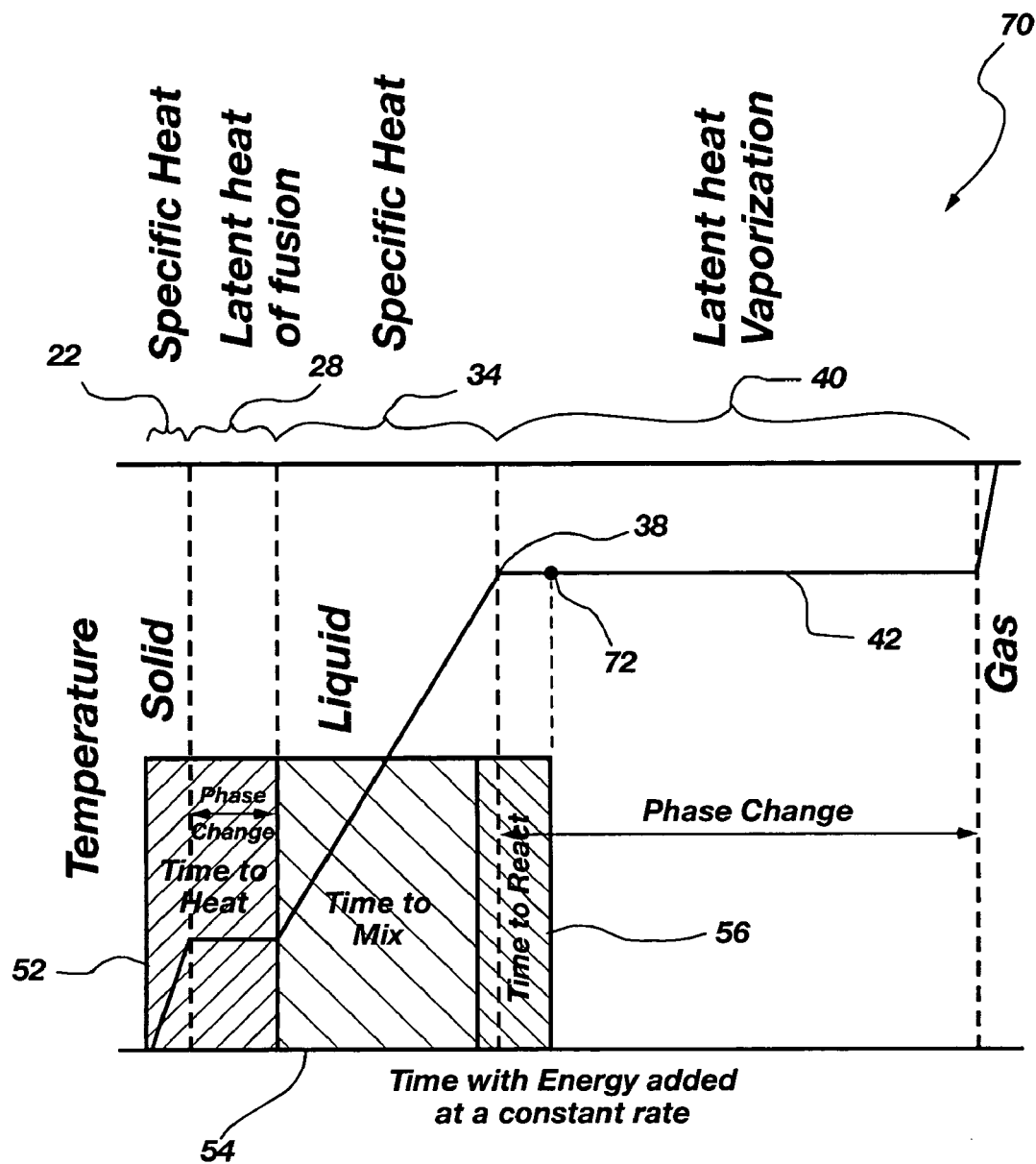
FIG. 5 is a combined temperature versus time graph and optically visible mark timing graph for a second velocity according to the embodiment represented in FIG. 1.

The slope of the temperature rise in FIG. 5 is steeper than the slope of the temperature rise in FIG. 4 because the power being used with respect to the graph in FIG. 5 is twice as much as the power being used at the rotating speed for the graph shown in FIG. 4. In any event, the important aspect being illustrated in FIG. 5 is that, at higher speeds, the reaction time may run into the vaporization region, resulting in ablation, as shown in FIG. 5.

It may be desirable to increase the rotating speed to reduce the labeling time. FIGS. 4 and 5 show that, with the application of constant power, there is a rotating speed limit between 1x and 2x, above which significant ablation occurs in the recording medium. Accordingly, it may be desirable to limit the level of power applied to the recording medium, such that the rotating speed of the recording device is not the controlling parameter in the process of recording images on the label side of the recording device.

Figure 6:
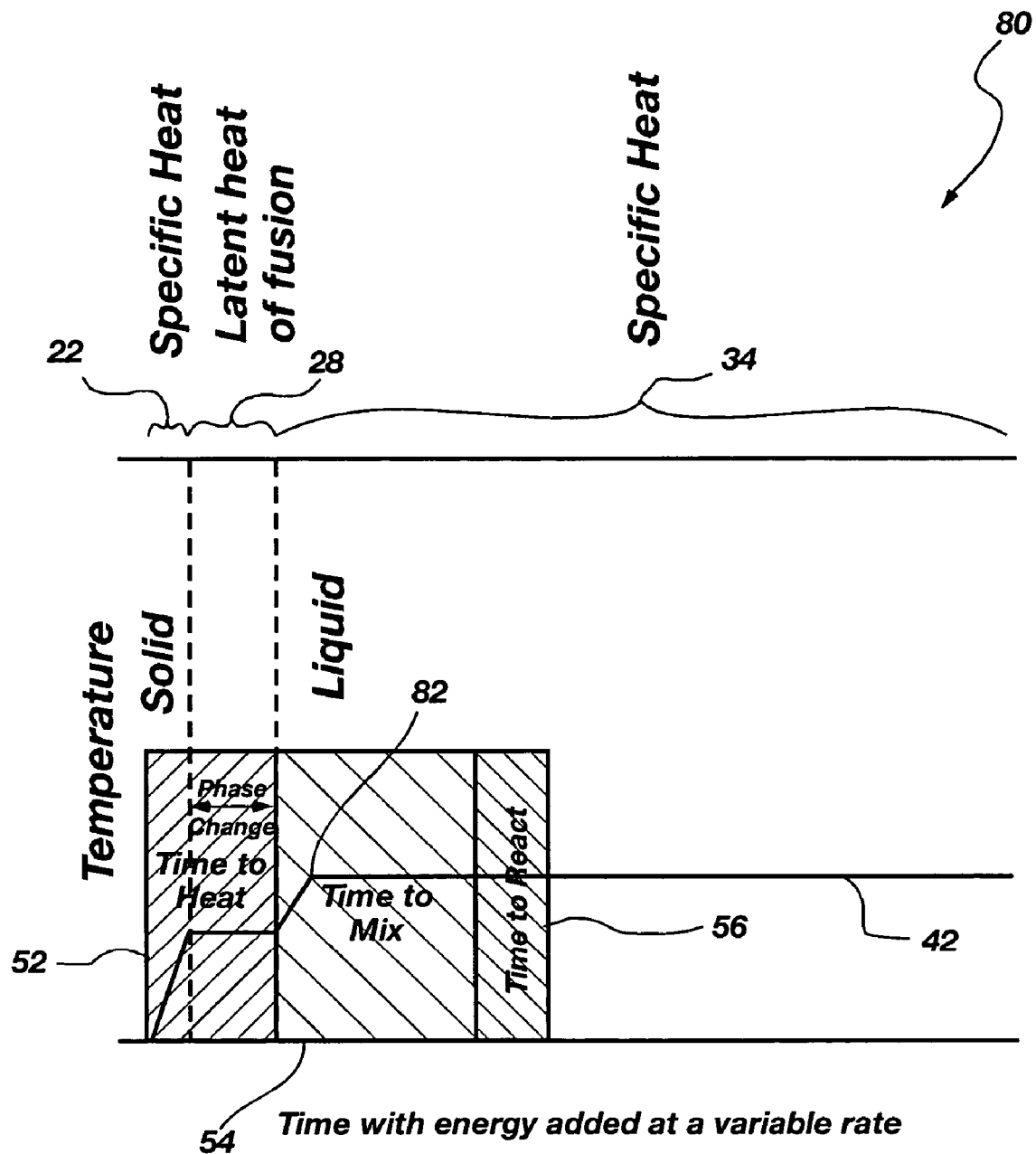
FIG. 6 is a combined temperature versus time graph and optically visible mark timing graph for a varying power level according to another embodiment of the present invention.

Referring now to FIG. 6, a combined graph 80 is shown, again superimposing the time graph 50 of FIG. 3 over the time versus temperature graph 20 of FIG. 2. As before, the time to heat 52 coincides with the specific heat time 22 and the latent heat of fusion time 28, which together result in liquefaction of the recording medium. However, the amount of power provided after liquefaction is no longer constant but has been modified so that the temperature does not exceed a value indicated by point 82. By modulating the power to hold the temperature at the value shown at 82, the glass or a liquid recording medium is maintained without ablation during the time to mix 54, the time to react 56 and beyond. That is, the period 34 of specific heat for the glass or a liquid recording medium extends indefinitely, because the ablation temperature point is never reached. Likewise, the power level maintains the temperature of the recording medium substantially constant, whether the rotating speed of the recording medium is at 1x or 2x or other speeds.

As discussed above, by changing the power level after liquefaction, and maintaining that level below the ablation point, no substantial ablation will occur. Although not shown in FIG. 6, this change might be achieved by reducing the average power level, or by making some other change in the average power level sufficient to keep the energy level of the recording medium below a second energy level at which substantial ablation or disintegration of the recording medium occurs.

Figure 7A:
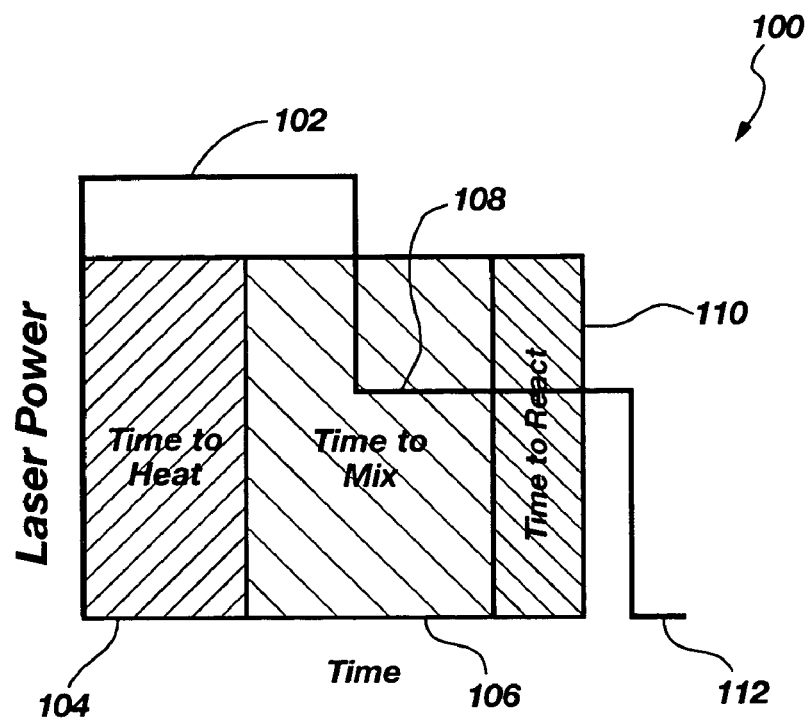
FIGS. 7A and 7B are power versus time graphs according to the embodiment shown in FIG. 6.
Figure 7B:
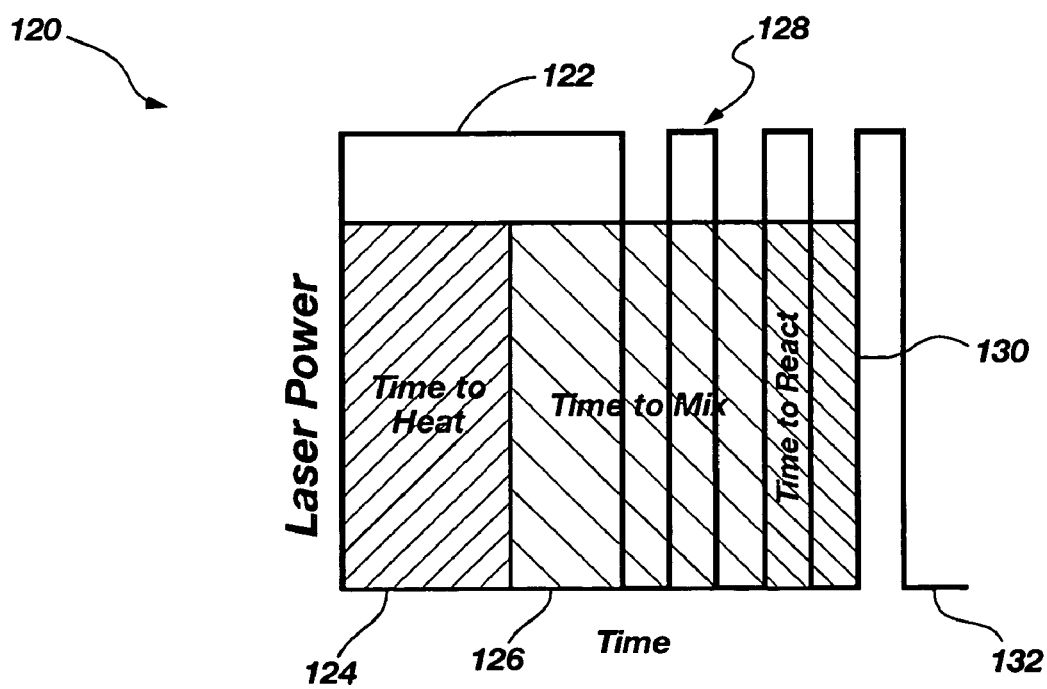

FIGS. 7A and 7B illustrate two ways in which the power may be modulated to achieve the result shown in FIG. 6. In FIG. 7A, a time versus laser power graph 100 is shown, in which the laser power level is maintained at a high level 102 during the time period to heat 104 and part of the time period to mix 106. Then the laser power is dropped to a lower level 108 for the remaining mixing time period and through the shorter time period to react 110. Both levels 102 and 108 are sufficiently high to maintain a write on the medium. After the desired reaction time period 110 has ended, the laser power is dropped to a standby level or off 112.

In FIG. 7B, another time versus laser power graph 120 is shown, in which the laser power is maintained at a high level 122 during the time period to heat 124 and during part of the time period to mix 126. Then the laser power level is delivered in a series of pulses 128 modulating from level 122 to a low or off level 130. Again, after the desired reaction time period 130 is completed the laser power drops to the low or off level 132.

Figure 8:
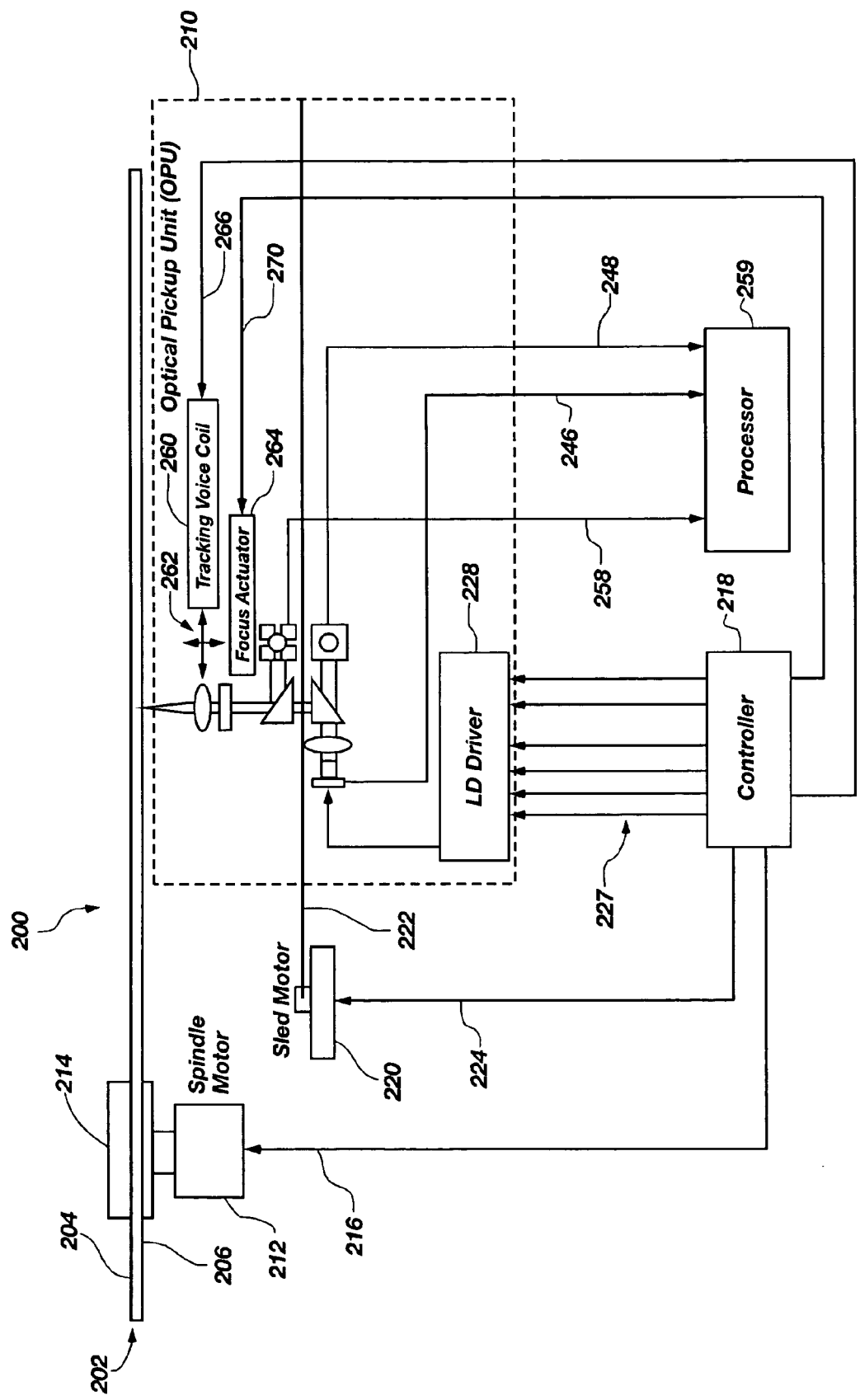
FIG. 8 is a schematic diagram of a laser writing and detection system according to an embodiment of the present invention.
Figure 9:
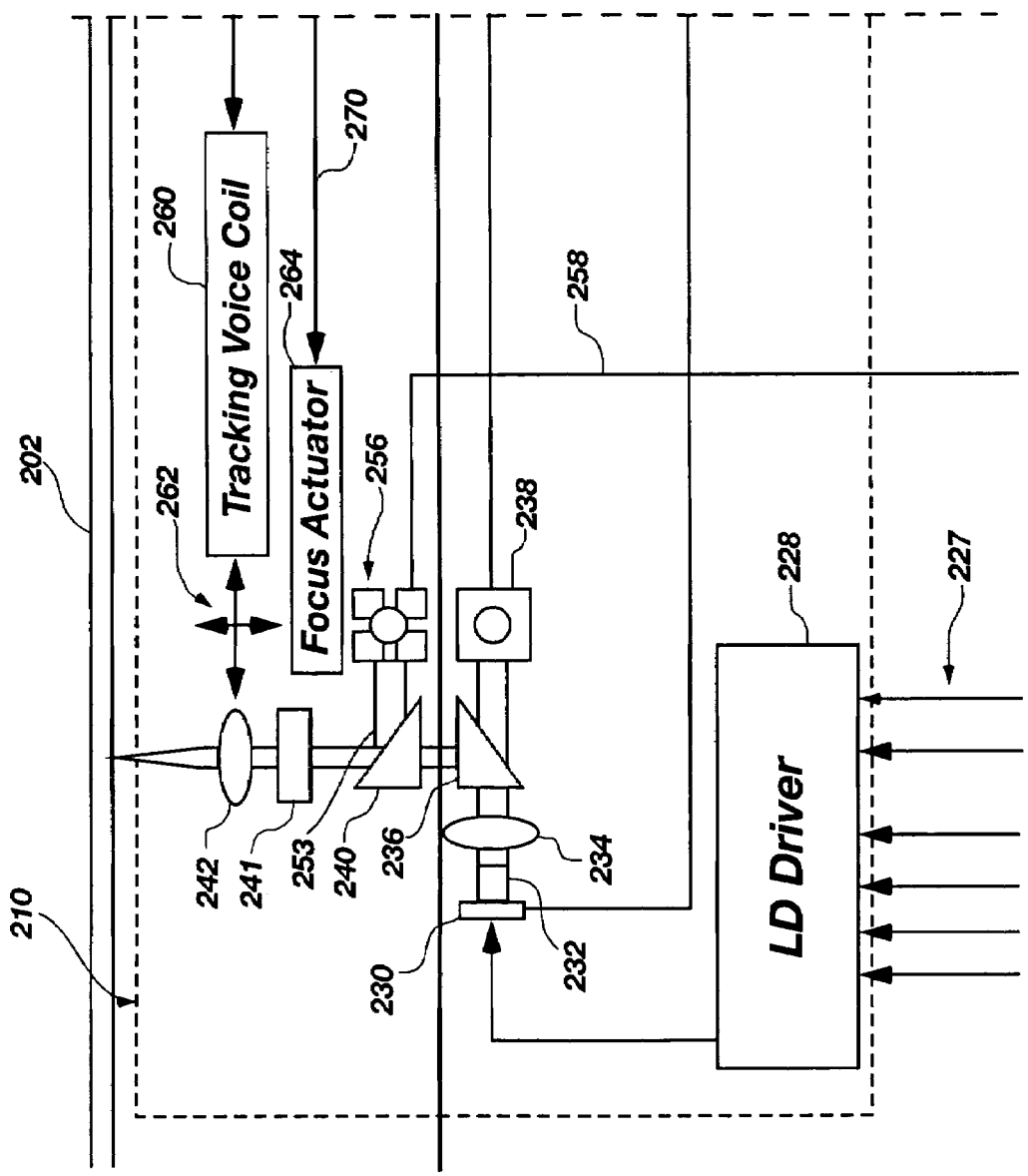
FIG. 9 is a partial schematic view of the diagram shown in FIG. 1.

FIGS. 8 and 9 show a data storage device 200 according to an embodiment of the invention, in which a laser is used for writing marks on an optical disc and for detection of the written marks to determine the results of the write operation. The data storage device 200 is used for reading from and/or writing to an optical disc 202. More specifically, the data storage device 200 is used for reading and/or writing to an optically writable data side 204 of the optical disc 202. After the data writing operation is completed, in one embodiment the optical disc is turned over so that the label side 206 of optical disc may be written upon, for the purpose of labeling and otherwise marking the optical disc 202. In another embodiment, the data side and the label side may be the same side of the optical disc. An optical pickup unit (OPU) 210 provides the energy beam, lenses and other devices necessary to provide energy beams for reading and writing the medium, as explained below.

The storage device 200 includes a spindle motor 212 and a spindle 214 for rotating the optical disc 202. Specifically, the optical disc 202 is situated on the spindle 214, which is rotated or moved by the spindle motor 212 to a position specified by an input control signal 216. A controller 218 provides control signal 216, and is comprised of control hardware and/or software.

The storage device 200 further includes a sled motor 220 and a sled rail 222 for moving a sled (not shown) that supports the OPU 210. Specifically, the OPU 210 is situated on the sled that is moved on the sled rail 222 by the sled motor 220 to a given position specified by a sled control signal 224 coming from controller 218.

The OPU 210 writes and reads label data on label side 206 of optical disc 202. In one embodiment, the optical disc 202 is rotated by spindle 214 as the label data is written on optical disc 202. The sled causes the OPU 210 to move radially so that the label data is written in radial increments that may or may not constitute tracks on optical disc 202. The manner of moving the spindle 214 and sled to cause the OPU 210 to write label data is not a part of this invention and may vary in different applications of the invention.

Again referring to FIG. 8, controller 218 generates laser control signals 227 to a laser diode driver 228 to drive the OPU 210. A tracking voice coil 260 is connected to a fine adjustment mechanism 262 to make small adjustments to the tracking operation of the sled and sled motor 220. Concentric or spiral tracks, such as are typically used on the data side 204 of optical disc 202 may not be needed on the label side 206. Instead, the sled may move in small increments, such as about 250 micron steps, to provide the desired image labeling. A focus actuator 264 is associated with lens 242 to adjust focus of lens 242 as desired. A tracking control signal 266 is directed from controller 218 to the tracking voice coil 260. A focus control signal 270 is directed from the controller 218 to the focus actuator 264.

Next, looking at FIG. 9, the OPU 210 is shown in greater detail. A laser 230 is disposed to generate a laser beam 232 that is directed to lens 234, changing the diverging beam to a substantially collimated beam. The beam 232 then passes to a dichroic mirror 236 that causes a portion of the beam to be reflected and pass through the polarizing beam splitter 240. The remainder of beam 232 passes through dichroic mirror 236 to a front sense diode 238 that senses the strength of beam 232. After passing through polarizing beam splitter 240, beam 232 is directed through a quarter wave plate 241 and a focusing lens 242 to write on label surface 206 of optical disc 202.

The quarter wave plate 241 changes linearly polarized light from the laser (P polarized) into circularly polarized light. The circularly polarized light is reflected from the disc 202 and is changed back into linearly polarized light (S polarized) by the quarter wave plate 241. The resulting light is at 90 degrees polarization to the original light from the laser. This allows the returned S polarized light to be reflected by the polarizing beam splitter 240. The quarter wave plate 241 is required for the beam splitter 240 to operate.

During detection, laser 230 again generates beam 232 that passes through a lens 234, acting to change the beam 232 to a substantially collimated beam. Beam 232 passes through dichroic mirror 236 polarizing beam splitter 240 to impinge upon the image written earlier on label surface 206 by focused beam 232. The reflected beam 253 passes back through lens 242 and quarter wave plate 241 to polarizing beam splitter 240. A portion of the reflected beam 253 is intercepted by four photo-detectors 256. A SUM signal 258 is generated by photo-detectors 256 and sent to a processor 259, shown in FIG. 8. This SUM signal corresponds to the reflected light from the disc surface.

In a label writing operation, laser 230 may be an rf diode laser emitting a light beam having a wavelength of, in one embodiment, about 780 nanometers in order to effectively interact with chemicals on the medium and cause image marking to take place. Different wavelength light beams may be emitted in other embodiments to effectively interact with different chemistries for making marks. The focus actuator 264 and tracking voice coil 260 are used in writing data on the data side 204 of optical disc 202.

When writing to the label side 206, the tracking voice coil 260 may not be used, since there may not be any tracks to follow. The laser diode driver 228 may utilize a digitally enabled current source set to a selected current value by an external resistor. The four photo-detectors 256 represent four quadrant sensors used to generate servo control signals that may drive focus and tracking control signals from controller 218.

The laser diode driver 228 may utilize a digitally enabled current source set to a selected current value by an external resistor. The four photo-detectors 256 represent four quadrant sensors used to generate an output signal 258 to the processor 259. In turn, the processor 259 may cause the controller 218 to generate control signals 227 to the laser diode driver 228, to thereby adjust the power level of laser 230.

It should be understood that the above-referenced arrangements are illustrative of the application for the principles of the present invention. It will be apparent to those of ordinary skill in the art that numerous modifications can be made without departing from the principles and concepts of the invention as set forth in the claims.

What is claimed is:

1. A method for recording graphic image data on a recording medium using an electromagnetic radiation beam to induce a change in an energy level of the recording medium, thereby providing a chemical reaction in light sensitive materials on the medium to form an image, comprising:
(a) applying the electromagnetic radiation beam to the recording medium in a first power profile;
(b) maintaining the first power profile at or below a first power level until a first energy level of the recording medium is reached wherein an energized state of the recording medium provides the chemical reaction sufficient to form the image;
(c) changing the electromagnetic radiation beam power to a second power profile having an average power level sufficient to keep the energy level of the recording medium below a second energy level at which substantial ablation or disintegration of the recording medium occurs; and
(d) maintaining the second power profile at or below a second power level to keep the energy level of the recording medium above the first energy level and below the second energy level.

2. The method of claim 1, wherein the step of applying the first power profile comprises applying power sufficient to raise the energy level of the recording medium to substantially obtain the chemical reaction.

3. The method of claim 1, wherein the step of applying the second power profile comprises reducing power in the second power profile so that the average power level is less than that of the first power profile to maintain the energy level of the recording medium below the ablation level.

4. The method of claim 1, wherein the first power profile comprises a steady level of power at a first amplitude.

5. The method of claim 1, wherein the second power profile comprises a steady second level of power at a second amplitude lower than the first amplitude.

6. The method of claim 1, wherein the step of maintaining the first power profile is carried out until the recording medium has transitioned from a solid to a glass or a liquid.

7. The method of claim 1, wherein the step of maintaining the second power profile is carried out until the chemical reaction has been substantially complete.

8. The method of claim 1, wherein the step of maintaining the second power profile comprises applying pulses of power from the electromagnetic radiation beam.

9. The method of claim 1, wherein the step of maintaining the second power profile comprises controlling the energy level of the recording medium over time to achieve a predetermined delta contrast between the image being formed and the background area having no image.

10. The method of claim 1, wherein the step of changing the electromagnetic radiation beam power to a second power profile comprises reducing the electromagnetic radiation beam power to the steady-state second power level lower than the first power level.

11. The method of claim 1, wherein the step of maintaining the second power profile comprises pulsing the electromagnetic radiation beam power to achieve an average power lower than that of the first power profile.

12. The method of claim 1, wherein the energy level of the recording media is the temperature of the recording media, the first energy level is a first temperature level and the second energy level is a second temperature level.

13. Apparatus for recording image data on a recording medium using an electromagnetic radiation beam to induce a chemical reaction in heat sensitive materials on the medium to form an image, comprising:
(a) means for applying electromagnetic radiation power to the recording medium in a first power profile;
(b) means for maintaining the first power profile at or below a first power level until a first energy level of the recording medium is reached for the chemical reaction to occur sufficient to form the image;
(c) means for changing the electromagnetic radiation power to a second power profile having an average power level sufficient to keep the energy level of the recording medium below a second energy level at which substantial ablation of the recording medium occurs; and
(d) means for maintaining the second power profile at or below a second power level to keep the energy of the recording medium above the first energy level and below the second energy level.

14. The apparatus of claim 13, wherein the energy level of the recording media is the temperature of the recording media, the first energy level is a first temperature level and the second energy level is a second temperature level.

15. The apparatus of claim 14, wherein the means for applying the first power profile comprises means for applying power sufficient to raise the temperature of the recording medium to substantially obtain the chemical reaction.

16. The apparatus of claim 14, wherein the means for applying the second power profile comprises means for reducing power in the second power profile so that the average power level is less than that of the first power profile to maintain the temperature of the recording medium below the ablation level.

17. The apparatus of claim 14, wherein the means for maintaining the second power profile comprises means for controlling the temperature of the recording medium over time to achieve a predetermined delta contrast between the image being formed and a background area having no image.

18. The apparatus of claim 13, wherein the means for maintaining the first power profile comprises means for applying a steady level of power at a first amplitude.

19. The apparatus of claim 18, wherein the means for maintaining the second power profile comprises means for applying a steady second level of power at a second amplitude lower than the first amplitude.

20. The apparatus of claim 13, wherein the means for maintaining the first power profile comprises means for maintaining the first power profile until the recording medium has transitioned from a solid to a glass or liquid.

21. The apparatus of claim 13, wherein the means for maintaining the second power profile comprises means for maintaining the second power profile until the chemical reaction has been substantially complete.

22. The apparatus of claim 13, wherein the means for maintaining the second power profile comprises means for applying pulses of power from the electromagnetic radiation.

23. The apparatus of claim 13, wherein the means for changing the electromagnetic radiation power to a second power profile comprises means for reducing the electromagnetic radiation power to a steady-state second power level lower than the first power level.

24. The apparatus of claim 13, wherein the means for maintaining the second power profile comprises means for pulsing the electromagnetic radiation power to achieve an average power lower than that of the first power profile.

25. A method for visually marking a recording medium by inducing a phase change in a light-sensitive surface by heat absorption from laser radiation, comprising:
applying the laser radiation to a desired portion of the light-sensitive surface according to a first power profile for a first period sufficient to substantially obtain a color change at the desired portion; and applying the laser radiation to the desired portion of the light-sensitive surface according to a second power profile for a second period sufficient to complete the color change at the desired portion.

26. The method of claim 25, wherein the second power profile has an average power level less than the first power profile.

27. The method of claim 25, wherein the second power profile has an average power level configured to maintain the desired portion of the light-sensitive surface at a substantially constant temperature during the second period.

28. The method of claim 25, wherein the second power profile has an average power level insufficient to ablate the recording medium.

29. The method of claim 25, wherein the second power profile includes terminating the laser radiation to the desired portion after the color change at the desired portion is complete.

30. The method of claim 25, wherein the second power profile comprises a pulsed electromagnetic radiation power sufficient to achieve an average power lower than that of the first power profile.

31. Apparatus for visually marking a recording medium by inducing a phase change in a light-sensitive surface by heat absorption from laser radiation, comprising:
  means for applying the laser radiation to a desired portion of the light-sensitive surface according to a first power profile for a first period sufficient to substantially obtain a color change at the desired portion; and
  means for applying the laser radiation to the desired portion of the light-sensitive surface according to a second power profile for a second period sufficient to complete the color change at the desired portion.

32. The apparatus of claim 31, wherein the second power profile has an average power level less than the first power profile.

33. The apparatus of claim 31, wherein the second power profile has an average power level configured to maintain the desired portion of the light-sensitive surface at a substantially constant temperature during the second period.

34. The apparatus of claim 31, wherein the second power profile has an average power level insufficient to ablate the recording medium.

35. The apparatus of claim 31, comprising:
  means for terminating the laser radiation to the desired portion after the color change at the desired portion is complete.

36. The apparatus of claim 31, wherein the first power profile and the second power profile have an average power greater than a minimum write power applicable to the recording medium and less than a maximum write power applicable to the recording medium.

37. A mass storage device for forming an image on a recording medium, comprising:
  (a) an electromagnetic radiation emitter configured to produce electromagnetic radiation to induce a chemical reaction in heat sensitive materials on the medium to form the image; and
  (b) a processor configured to (1) apply electromagnetic radiation power to the recording medium in a first power profile, (2) maintain the first power profile at or below a first power level until a first energy level of the recording medium is reached for a chemical reaction to occur sufficient to form the image, (3) change the electromagnetic radiation power to a second power profile having an average power level sufficient to keep the energy level of the recording medium below a second energy level at which substantial ablation of the recording medium occurs, and (4) maintain the second power profile at or below a second power level to keep the energy of the recording medium above the first energy level and below the second energy level.

38. The apparatus of claim 37, wherein the processor is configured to apply the first power profile sufficient to raise a temperature of the recording medium to substantially obtain the chemical reaction.

39. The apparatus of claim 37, wherein the processor is configured to apply the second power profile to reduce power so that the average power level is less than that of the first power profile so as to maintain a temperature of the recording medium below the ablation level.

40. The apparatus of claim 39, wherein the processor is configured to maintain the second power profile by controlling the temperature of the recording medium over time to achieve a predetermined delta contrast between the image being formed and a background area having no image.

41. The apparatus of claim 37, wherein the processor is configured to maintain the first power profile by applying a steady level of power at a first amplitude.

42. The apparatus of claim 41, wherein the process is configured to maintain the second power profile by applying a steady second level of power at a second amplitude lower than the first amplitude.

43. The apparatus of claim 37, wherein the processor is configured to maintain the first power profile until the recording medium has transitioned from a solid to a glass or liquid.

44. The apparatus of claim 37, wherein the processor is configured to maintain the second power profile until the chemical reaction has been substantially complete.

45. The apparatus of claim 37, wherein the processor is configured to maintain the second power profile by applying pulses of power from the electromagnetic radiation.

46. The apparatus of claim 37, wherein the processor is configured to reduce the electromagnetic radiation power to a steady-state second power level lower than the first power level.

47. The apparatus of claim 37, wherein the processor is configured to reduce the electromagnetic radiation power to a second power level by pulsing the electromagnetic radiation power to achieve an average power lower than that of the first power profile.

48. Apparatus for visually marking a recording medium, comprising:
  a laser configured to apply radiation to a recording medium sufficient to induce a phase change in the recording medium by inducing a phase change in a light-sensitive surface by heat absorption from the radiation; and
  a processor configured to (1) apply the radiation to a desired portion of the light-sensitive surface according to a first power profile for a first period sufficient to substantially obtain a color change at the desired portion, and (2) apply the radiation to the desired portion of the light-sensitive surface according to a second power profile for a second period sufficient to complete the color change at the desired portion.

49. The apparatus of claim 48, wherein the second power profile has an average power level less than the first power profile.

50. The apparatus of claim 48, wherein the second power profile has an average power level configured to maintain the desired portion of the light-sensitive surface at a substantially constant temperature during the second period.

51. The apparatus of claim 48, wherein the second power profile has an average power level insufficient to ablate the recording medium.

52. The apparatus of claim 48, wherein the second power profile comprises a pulsed electromagnetic radiation power sufficient to achieve an average power lower than that of the first power profile.

53. A program storage system readable by a computer, tangibly embodying a program, applet or instructions executable by the computer to cause a laser to perform a method for visually marking a recording medium, comprising:
   applying laser radiation to a desired portion of a light-sensitive surface of the medium according to a first power profile for a first period sufficient to substantially obtain a color change at the desired portion; and
   applying the laser radiation to the desired portion according to a second power profile for a second period sufficient to complete the color change at the desired portion.

54. The program storage system of claim 53, wherein the second power profile has an average power level less than the first power profile.

55. The program storage system of claim 53, wherein the second power profile has an average power level configured to maintain the desired portion of the light-sensitive sensitive surface at a substantially constant temperature during the second period.

56. The program storage system of claim 53, wherein the second power profile has an average power level insufficient to ablate the recording medium.

57. The program storage system of claim 53, wherein the second power profile includes terminating the laser radiation to the desired portion after the color change at the desired portion is complete.

58. The program storage system of claim 53, wherein the second power profile comprises a pulsed electromagnetic radiation power sufficient to achieve an average power lower than that of the first power profile.

* * * * *

UNITED STATES PATENT AND TRADEMARK OFFICE
CERTIFICATE OF CORRECTION

PATENT NO. : 7,268,795 B2 Page 1 of 1
APPLICATION NO. : 10/976445
DATED : September 11, 2007
INVENTOR(S) : Lawrence N. Taugher et al.

It is certified that error appears in the above-identified patent and that said Letters Patent is hereby corrected as shown below:

In column 12, lines 6-7, in Claim 55, after "light-sensitive" delete "sensitive".

Signed and Sealed this

Fifth Day of August, 2008

JON W. DUDAS
*Director of the United States Patent and Trademark Office*